Sept. 15, 1953
E. KELLER
2,652,259
TRACK SHIFTING AND ADJUSTING DEVICE FOR MAGNETIC
SOUND RECORDERS AND REPRODUCERS
Filed May 10, 1950
2 Sheets-Sheet 1
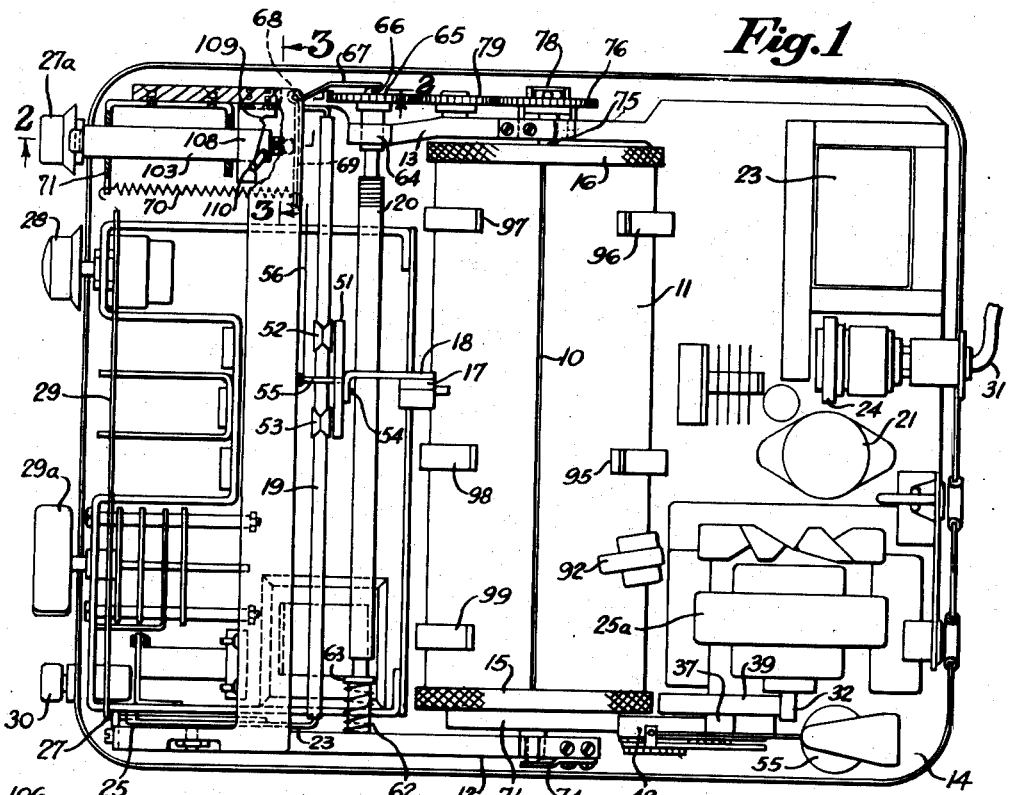
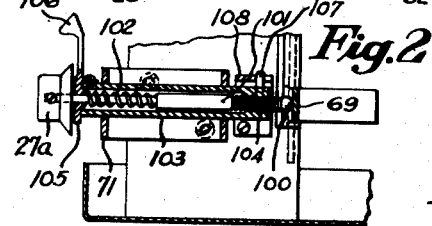
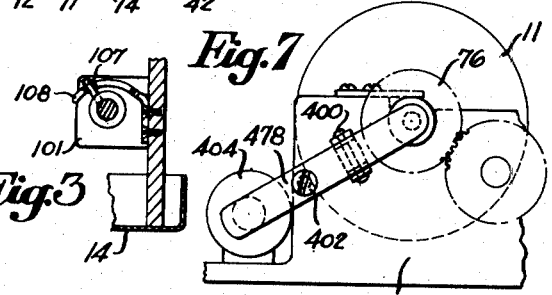
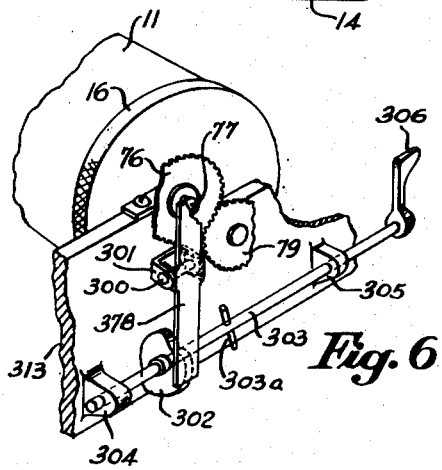
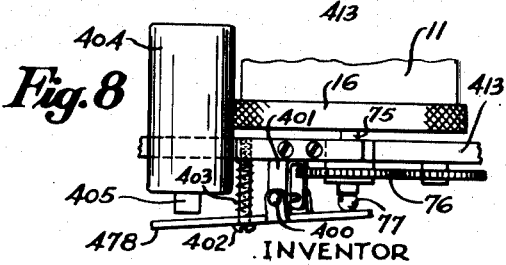
INVENTOR
Ernst Keller
BY
ATTORNEYS

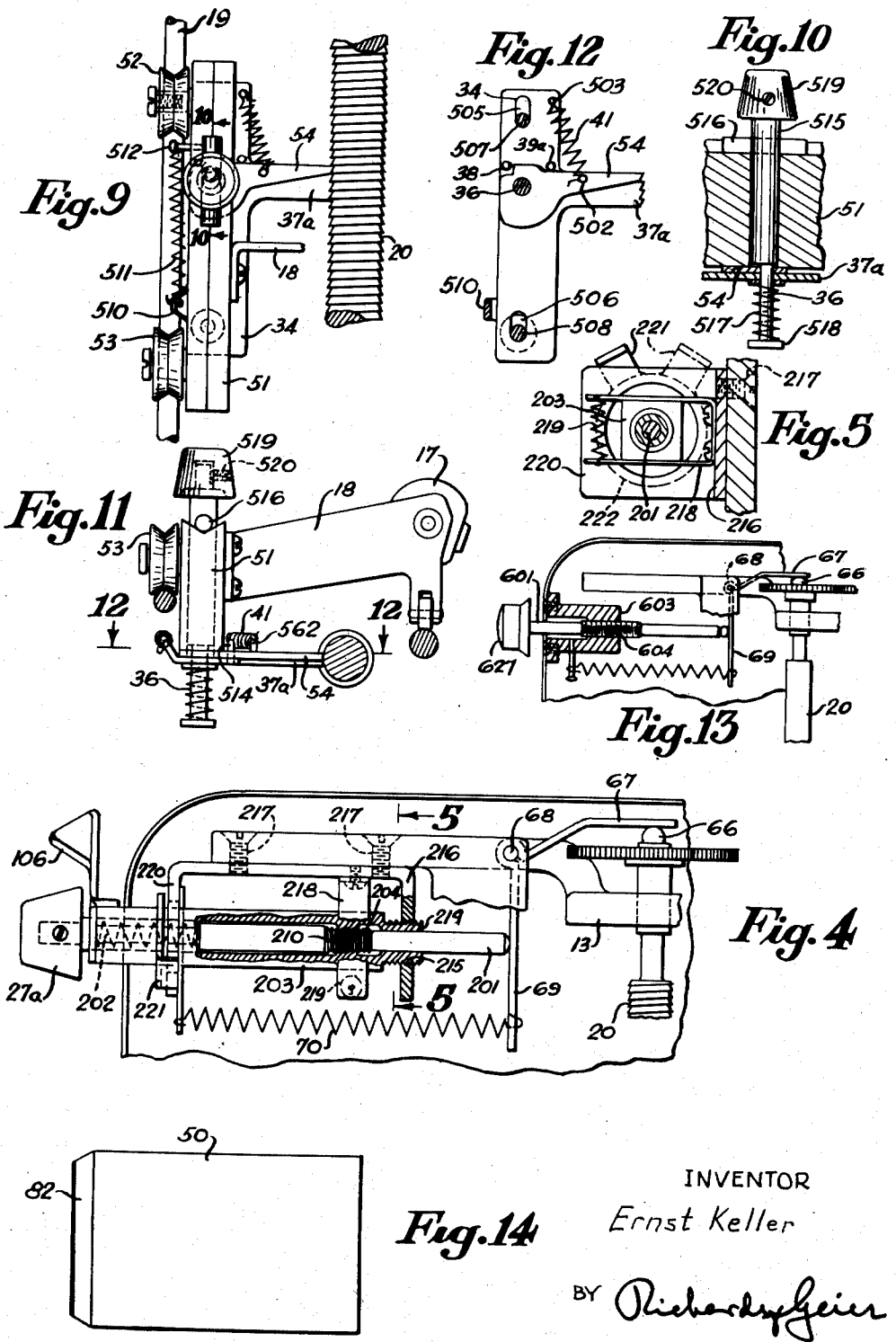

Patented Sept. 15, 1953

2,652,259

UNITED STATES PATENT OFFICE 2,652,259

TRACK SHIFTING AND ADJUSTING DEVICE FOR MAGNETIC SOUND RECORDERS AND REPRODUCERS

Ernst Keller, New York, N. Y., assignor to Machine Tool Works Oerlikon, Administration Company, Zurich, Oerlikon, Switzerland, a company of Switzerland Application May 10, 1950, Serial No. 161,064

4 Claims. (Cl. 274—20)

This invention relates to sound recording and reproducing machines, and refers more particularly to magnetic sound recorders and reproducers wherein the sound carrier usually has the form of a rectangular magnetic sheet similar to a sheet of writing paper. In the course of the operation of the machine as a recorder the magnetic sheet is wrapped around a drum and is revolved therewith, while a recording head is moved parallel to the drum axis. Thus, the sound is inscribed upon the magnetic sheet in the form of a helix.

Magnetic sheets of this nature are considerably more advantageous in operation than recorders wherein the sound is inscribed upon preformed grooves. One of the advantages of magnetic sheets is that sounds inscribed thereon may be erased by the application of magnets, whereupon the erased portion is available for repeated use in substantially the same manner in which a sheet of paper inscribed in pencil is subject to erasures and corrections.

Another advantage of the magnetic sheet is that after being inscribed it may be folded and sent through the mails in the form of a letter, to be played back by the recipient. Magnetic sheets are light in weight and quite thin, so that they may be folded, handled, filed and preserved in substantially the same manner as writing paper.

An object of the present invention is to improve sound recording and reproducing machines of the described type through the provision of means which will provide insertions and interlineations upon magnetic sheets bearing an inscribed sound track.

A further object is to provide sound recording and reproducing machines having means for the provision of a plurality of parallel sound tracks upon the same magnetic sheet.

It is thus apparent that one of the main objects of the present invention is to provide such improvements in the sound recording and reproducing machines that the magnetic sheets thereof will be capable of functioning in essentially the same manner as a sheet of paper inserted into an ordinary typewriter now functions. Such typewriter produces upon a sheet of paper a lettering which extends in spaced, parallel rows, and the operator, by the use of back-spacing, may make necessary corrections and insert additional writing between the typed lines. Also, the user may fill in the spaces between the lines with a different text, for example, a running translation into a foreign language.

Yet another object of the present invention is to provide means for conveniently adjusting a sound reproducer to the sound track of a magnetic sheet inscribed by a different recording machine.

Other objects of the present invention will become apparent in the course of the following specification.

The objects of the present invention may be realized through the provision of a sound recording and reproducing machine which is provided with means for shifting in a direction parallel to the longitudinal axis either the spindle of the recording head or the drum carrying the magnetic sheet, or the recording head itself. Obviously, the same machine may be provided with means for shifting two or all of these parts. It is apparent that when one of these parts is shifted longitudinally during or after the recording of a sound track upon a magnetic sheet, another sound track parallel to the first one will be provided upon the sheet, granted, of course, that the extent of the shifting is not the same as the pitch of the helical sound track. In order to avoid an intersection of sound tracks it is necessary that the shifting of one of the aforesaid parts be less than the pitch of the original sound track.

It is apparent that the shifting operation may be carried out between a number of predetermined positions, as a result of which parallel sound tracks will be inscribed upon the magnetic sheet. Such shifting, when used in conjunction with the back-spacing provided by the machine, will make it possible for user to shift at will from one sound track to another, either for recording or reproducing purposes.

In addition to such shifting, the purpose of which is to create parallel sound tracks, the machine is provided with a device for fine adjustment, the purpose of which is to adjust the machine to the sound track of a magnetic sheet. It is apparent that the different recording machines may produce differently located sound tracks, and this fine adjustment makes it possible to place the sound head directly in contact with the sound track.

The invention will appear more clearly from the following detailed description, when taken in connection with accompanying drawings showing, by way of example, preferred embodiments of the inventive idea.

In the drawings:

Figure 1 is a plan view of a recording and reproducing machine with the cover removed, illustrating a method of shifting the spindle;

Figure 2 is a partial section along the lines 2—2 of Figure 1;

Figure 3 is a partial section along the line 3—3 of Figure 1;

Figure 4 is a partial, sectional view of another machine illustrating another method of shifting the spindle;

Figure 5 is a partial section along the line 5—5 of Figure 4;

Figure 6 is a partial, perspective view, with some parts broken off, of a different machine wherein the track shifting is carried out by the drum;

Figure 7 is a partial, side view illustrating magnetic means for shifting the drum to different tracks;

Figure 8 is a plan view of the part of the machine shown in Figure 7;

Figure 9 is a top view of a part of a differently constructed machine wherein the shifting of the sound head causes the track shifting;

Figure 10 is a vertical section along the line 10—10 of Figure 9;

Figure 11 is partly a side view and partly a section on an enlarged scale of the device shown in Figures 9 and 10;

Figure 12 is a section along the line 12—12 of Figure 11;

Figure 13 shows diagrammatically and in section a device for carrying out fine adjustment, which may be used in conjunction with the shifting devices shown in Figures 6 to 12;

Figure 14 shows a magnetic sheet on a smaller scale.

The sound recording and reproducing machine shown in Figures 1, 2 and 3 includes a substantially hollow rotary drum 11 having an elongated slot 10 for the insertion of a magnetic sheet 50, shown in Figure 14.

The drum 11 is carried upon supporting brackets 12 and 13, which are mounted upon a base plate 14. The drum 11 is provided with projecting, preferably knurled, flanges 15 and 16.

The recording of sound upon the recording sheet 50, and the reproduction of sound, are effected by means of a sound head 17 which, in operation, rests lightly upon the sheet 50 for the purpose of recording sound thereon, or reproducing sound. The sound head 17 is connected to a support 18 which is mounted upon a plate 51. Two rollers 52 and 53 are rotatably mounted in the plate 51, and are carried by a rod 19. It is thus apparent that the rollers 52 and 53 ride upon the rod 19 so that the sound head 17 may be shifted in a direction parallel to the axis of the drum 11.

The plate 51 also carries a projection 54 which is in engagement with the threads of a threaded spindle 20. The plate 51 is provided upon its front end with a pin or projection 55 to which one end of the wire 56 is attached. The opposite end of the wire is connected to a spring (not shown) which tends to maintain it in a stretched condition.

The general principles of this machine are described in greater detail, and claimed, in the co-pending patent application of Ernst Keller, Serial No. 118,153, filed September 27, 1949.

The rod 19 is attached to two levers 23, which are rotatably supported in bearing plates 12 and 13. The other ends of the levers 23 carry projecting staples 25 which serve as fulcra for two levers 27, only one of which is shown in Figure 1. The levers 27 are joined by a transverse bar 29 which extends the entire length of the drum 11.

It is apparent that a back-spacing movement of the head 17 can be effected conveniently by exerting a short pressure on the bar 29. This back-spacing movement is described in detail, and claimed, in the co-pending patent application of Ernst Keller and Hans Sigrist, Serial No. 134,278, filed December 21, 1949, now abandoned.

The spindle 20 is supported at both ends by the same brackets 12 and 13 which support the drum 11. A coil spring 62 encloses one end of the spindle 20, and has an end pressing against the bracket 12. The opposite end of the coil spring 62 presses against a flange 63 constituting a part of the spindle 20.

The drum 11 carries an annular surface 71 adjacent the flange 15. The opposite end of the drum 11 carries a pivot 75 which is firmly connected with a gear wheel 76. The gear 76 meshes with a gear 79, which, in its turn, meshes with the gear 65, which is firmly connected to the spindle 20. The drum 11 is driven by an electric motor 25a having a motor shaft 32, which may be engaged by a wheel 39. The wheel 39 rotates along with a roller 37 which may be engaged by a wheel 42. The wheel 42 may engage the flange 71 of the drum 11.

The machine is operated by switching on and off the switch 28 which provides electric current flowing through the wires 31 to the motor 25a. A switch 30 is used to operate a magnet 55 which establishes operative connection between the motor 25 and the drum 11 through the motor shaft 32 and the wheels 39, 37, 42 and 71. This drive is described in detail, and claimed, in the co-pending patent application of Ernst Keller, Serial No. 149,233, filed March 13, 1950.

As already stated, the drum 11 has a slot 10 which is used for the insertion of the reinforced top edge 82 of the magnetic sheet 50. An inclined roller 92 and resilient fingers 95 to 99 are used to hold the magnetic sheet 50 in place upon the drum 11. This construction is described in greater detail, and claimed, in the co-pending patent application of Franz Roggen et al., Serial No. 156,546, filed April 18, 1950.

In the construction shown in Figures 1, 2 and 3, the sound track adjustment is produced by mechanical means which shift the spindle 20.

As already stated, one end of the spindle 20 is supported by the bracket 12. The opposite end of the spindle extends through a bearing 64, which is mounted in the bracket 13. This end of the spindle projects beyond the bracket 13 and carries the ball 66 along with the gear wheel 65. The ball 66 engages a rigid plate 67 which is rotatably mounted upon a column 68. The plate 67 is firmly connected with a plate 69 extending substantially at right angles thereto. It is apparent that the two plates 67 and 69 swivel about the column 68. A heavy spring 70 is connected to the plate 69 and to a support 71. Thus, the spring 70 presses the plate 69 firmly against a sphere-shaped end 100 of a threaded rod 101. The rod 101 has a reduced portion which is firmly connected to a knob 27a, which is used for fine tuning or adjustment, as will be described in greater detail hereinafter.

The rod 101 is enclosed by a tube 103 having a threaded portion 104 which meshes with the screw threads of the rod 101. The outer end of the tube 103 is connected with a cover 105 which is located close to the knob 27a and which is integral with a handle 106. The inner end of the rod 101 carries a pin 107 which extends through an opening provided in the tube 103. The outer end of the pin 107 is located close to an edge of a sleeve 108. As shown in Figure 1 the sleeve 108 has two notches, 109 and 110. These notches are adapted to receive the pin 107.

The operation of the machine is as follows:
When the switch 28 is switched on, the motor 25a is energized by the electric current flowing through the wires 31. The turning of the switch 30 will energize the magnet 55 which will provide a driving connection between the motor 25 and the drum 11 through the shaft 32 and the wheels 39, 37, 42 and 71.

The electric rectifier section of the machine, which includes a rectifier tube 21, transformer 23 and a fuse 24, is of standard construction and does not constitute a part of the present invention.

It should be noted in this connection that the plate 67 constitutes a rigid support for one end of the spindle 20, while the spring 78 constitutes a support for one end of the drum 11.

As already stated, the magnetic sheet 50 is carried upon the drum 11 with its end 82 within the slot 10. The sheet is held in this position by the wheel 92 and the fingers 95 to 99.

The rotation of the drum 11 is transmitted to the spindle 20 through the gears 76, 79 and 65. Since the sound head 17 is in engagement with the spindle 20 through the pawl 54, the sound head 17 will move along the drum 11 and will inscribe a helical sound track upon the magnetic sheet 50, as well as reproducing an inscribed track into sounds by the usual play-back system, not shown in the drawings. The change from recording to play-back, and vice versa, is carried out by the switch 29a.

The user may stop the machine instantaneously by operating the switch 28. He can shift the sound head 17, step by step, backward in relation to the drum 10 by operating the transverse rod 29 which will raise the follower 54 from contact with the threads of the spindle 20, thereby making it possible for the spring-tensioned wire 56 to pull back the sound head 17. To move the sound head 17, at will, either forward or backward in relation to the helical track on the drum 10, the operator simply depresses the plate 51, using the knob 519 that extends above the cover of the machine.

In accordance with the present invention, the user can place the sound head 17 in a space between two tracks inscribed, or about to be inscribed, thereby creating a second track merely by turning the lever 106.

Since the lever 106 is integral or firmly connected to the tube 103, the tube will turn along with the lever. Since the pin 107 is firmly connected to the rod 101 and extends through an opening formed in the tube 103, the rod 101 will participate in this turning motion. The function of the spring 102 during this operation is to prevent relative movement between the threads of the rod 101 and the threads 104 of the tube 103. Since, as shown in Figure 1, the notches 109, 110 are located at different distances from the plate 69, and since the turning of the lever 106 will cause either a forward or rearward movement of the rod 102, it is apparent that the two end positions of the pin 107 will correspond to different positions of the plate 69, which is always maintained in contact with the spherical end 100 of the rod 101 by the spring 70.

Thus, two different tracks are produced by moving the pin 107 from its position in one of the notches 109 or 110 to a position within the other one of these notches.

Since the plate 69 is rigidly connected to the plate 67, which presses against the end 66 and the spindle 20, it is apparent that the two positions of the plate 69 correspond to two positions of the spindle 20, which is pressed against the plate 67 by the spring 62. Thus, the turning of the lever 106 causes a longitudinal shifting of the spindle 20, and the two end positions of the lever 106 correspond to two predetermined positions of the spindle 20. The dimensions of the various parts must be so selected that the distance between these two end positions is substantially equal to one-half of the pitch of the helical sound track, so that the second sound track will be located substantially in the middle of the first track.

It is apparent that the operator can use the second sound track for interlineations or additions to the originally dictated text. In that case the beginning of the additional text may be indicated upon the original track by a sound signal.

On the other hand, the user might employ the second sound track in its entirety to provide a text running parallel to the original text. This may be utilized, for example, by employing the second sound track for translating into a foreign language the record of the first sound track, and for a variety of other purposes. The change from one sound track to another can be effected conveniently and quickly by operating the lever 106, while the change from recording to play-back, and vice versa, is quickly accomplished by turning the switch 29a.

In addition to this change from one sound track to another it is sometimes necessary to carry out a fine adjustment of the position of the recording head so that it will be located directly upon a recorded sound track. This is particularly necessary when the machine is used for playing back a sheet recorded by another machine, since despite precision manufacture it is quite possible that, as a result of minute variations in the different parts, one machine will produce a sound track at a somewhat different location than another machine.

This fine adjustment is carried out by turning slightly the knob 27a. Since the rod 101 is firmly connected to the knob 27a it will rotate along with it, and since the screw threads of the rod 101 mesh with the screw threads 104 of the tube 103, the rod 101 will carry out a movement in the direction of its longitudinal axis. This movement is transmitted to the plate 69, which is in engagement with the spherical rod end 100, by the spring 70. The adjustment of the position of the plate 69 will produce an adjustment of the position of the spindle 20 which is engaged by a plate 67 rigidly connected with a plate 69.

Figures 4 and 5 show a somewhat different mechanism for operating the spindle 20 which, as in the previously described construction, has a spherical end 66 engaged by a plate 67 which is integral with the plate 69. The plates 67 and 69 are mounted upon a column 68 and the plate 69 is pressed against the inner end of a rod 201 by a spring 70. The outer end of the rod 201 is connected with a knob 27a. The rod 201 is somewhat different in construction from the rod 101 (Fig. 2) since the rod 201 has a comparatively small, intermediate, threaded portion 210 which is engaged with corresponding screw threads 204 of a rectangular casing 203. The casing 203 is firmly connected to the positioning handle 106. The rod 201 has a reduced portion which is enclosed by a spring 202. As shown in Figure 4, the member 203 has a threaded portion 214 which meshes with the screw threads 215 of a supporting bracket 216. The bracket 216 is connected by screws 217 to a frame 13.

Springs 218 are attached to the support 216 and are pressed by a coiled spring 219 against opposite sides of the rectangular member 203. The support 216 has a front portion 220, the upper edge of which is engaged by a stop 221. The stop 221 is integral with a flange 222 connected to the casing 203.

It is apparent that the lever 106 may be operated to shift the stop 221 from the position shown in full lines in Figure 5 to the position shown in broken lines thereon, and vice versa. In the course of this movement the casing 203 and the rod 201 will move longitudinally, thereby shifting the position of the plate 69 and, consequently, changing the position of the spindle 20. The springs 202 and 218 in this construction perform a function similar to the spring 102 in the construction shown in Figure 2, namely, they prevent relative movement between screw threads 210 and 204 during the shifting from one sound track to another.

The fine adjustment to an inscribed sound track is carried out by turning the knob 27a with the result that the pin 201 will turn in relation to the screw threads 204, and will carry out the movement in the longitudinal direction, thereby shifting the positions of the plates 69 and 67, and of the spindle 20.

The two described constructions provide means for shifting the spindle 20 in order to change from one sound track to a second sound track. The construction illustrated in Figure 6 provides mechanical means for shifting the position of the drum 11 for the same purpose. This drum may be of the same construction as the one previously described, and may be provided with a knurled flange 16 and a pivot carrying a spherical end 77 and a gear 76 which meshes with the gear 79. The opposite end of the drum 11 (not shown) is engaged by a spring similar to the spring 74 shown in Figure 1.

In accordance with the present invention, the member 378, which engages the end 77, has the form of an elongated plate which is pivotally supported intermediate its ends by a pivot 300. The pivot 300 is mounted in a bracket 301 which is attached to support 313.

The opposite end of the plate 378 is engaged by a cam 302 which is keyed upon a shaft 303. The shaft 303 is supported in brackets 304 and 305, carried by the support 313. The outer end of the shaft 303 carries a lever 306.

The lever 306 may be situated in two positions, limited by the cross rod 303a, namely, an upper and a lower position. When the lever is turned from the upper position, shown in Figure 6, to its lower position, the cam 302 will rotate along with the shaft 303, and will turn the plate 378 so that the upper end of the plate 378 will push against the pivot of the drum 11. Thus, it is apparent that the turning of the lever 306 will change the position of the drum 11, and that the two end positions of the drum will be determined by the shape of the cam 302.

In the construction shown in Figures 7 and 8, the same shifting of the drum 11, which causes the changeover from one sound track to another, is carried out by magnetic means. The drum 11 may be of the same construction as the ones previously described, and may have a flange 16, a pivot 75 carrying a gear 76, and a spherical end 77. A plate 478 is pivotally mounted intermediate its ends upon a pivot 400 carried by a bracket 401. The bracket 401 is carried by the support 413. A bolt 402 extends through an opening provided in the plate 478 and is screwed into the support 413. A coiled spring 403 encloses the bolt 402 and presses with one end against the support 413, and with the other end against the plate 472. The plate 478 consists of any suitable magnetizable material which may be attracted by magnet 404.

In this construction the shifting from one track to another is accomplished by energizing the magnet 404 by means of any suitable switch, not shown in the drawings. The magnet 404 will attract the plate 478 until it strikes the end 405 of the magnet. The drum 11 will be compelled to follow the plate 478 by the pressure of a spring (not shown) exerted upon the opposite end of the drum. This turning movement of the plate 478 will compress the spring 403.

As soon as the magnet 404 is de-energized the spring 403 will push the plate 478, along with the drum 11, into the initial position shown in Figure 8. It is thus apparent that in accordance with this construction the magnet 404 causes the shifting of the drum 11 into one of two positions corresponding to two different sound tracks.

Figures 9 to 12 illustrate a mechanism whereby the shifting to one of two sound tracks is carried out by operating the sound head 17. As already stated, the sound head 17 is carried by a support 18 which is attached to a carriage 51. The carriage 51 includes wheels 52 and 53 which are mounted upon the rod 19. The engagement between the sound head 17 and the spindle 20 is effected by the follower 54 which is rotatably mounted upon a pivot 36. The follower 54 is engaged by a spring 41, one end of which is attached to a pin 502. The opposite end of the spring 501 is attached to a pin 503 carried by a plate 34. The plate 34 has two elongated slots 505 and 506 through which extend the pivots 507 and 508, respectively. The plate 34 is integral with the follower arm 37a. The plate 34 carries an ear 510 to which one end of the spring 511 is attached. The opposite end of the spring 511 is attached to a pin 512 carried by the carriage 51.

The follower 54 has jutting, cam-like surfaces which are adapted to be engaged by pins 38 and 39a, which are carried by the plate 34.

The use of the two followers 37a and 54 is described and claimed in the aforesaid patent application of Keller and Sigrist.

In the illustrated construction the top surface of the carriage 51 has the form of a V-shaped groove which contains a pin 516. The pin 516 is carried by a rod 515 which extends through the carriage 51, and the lower end of which is firmly connected with the pin or pivot 36. As shown in Figure 10, the lower end of the pin 36 projects below the followers 54 and 37a, and is embraced by the coiled spring 517, which rests upon a disk-shaped end 518 of the pin 36. The upper end of the rod 515 carries a knob 519 which is firmly attached thereto by the screw 520.

The operation of this mechanism is apparent from the above description:

In the position illustrated in the drawings, the sound head 17 is ready to inscribe one of the sound tracks. In order to shift to another sound track the user grasps the knob 519, pulling the rod 515 and the pin 36, and thereby compressing the spring 517. Then the user turns the knob 519 until the pin 516 is turned to the extent of 180°, whereupon his grip on the knob 519 is released, and the pin rests again in the V-shaped groove of the carriage 51. Since the pin 36 is eccentrically mounted in the rod 515, the turning of the rod 515 will cause a movement of the pin along with the plate 34 and the follower 54 connected therewith, such movement being possible through the provision of the elongated grooves 505 and 506 in the plate 34. Thus, the entire sound head would be shifted to an extent which would make possible the provision of a new sound track.

The constructions described in Figures 6 to 12 are all utilized for shifting from one sound track to another sound track. These various mechanisms must be combined with a fine adjustment mechanism which is illustrated, by way of example, in Figure 13 of the drawings, and which includes a knob 627, which is firmly connected with a rod 601. The rod 601 has screw threads meshing with the screw threads 694 of an inner tube 603. The inner end of the rod 601 engages a plate 69, which is pivoted at 68 and is firmly connected with the plate 67. The plate 67 engages the end 66 of a spindle 20.

It is apparent that the examples shown above have been given by way of illustration and not by way of limitation, and that they are subject to wide modifications and variations without departing from the scope or intent of the present invention. All such modifications and variations are to be included within the scope of the present invention.

What is claimed is:

1. In a sound recording and reproducing machine, a sheet-carrying drum, a threaded spindle extending parallel to the axis of said drum, sound head means comprising a follower engaging the threads of said spindle and a recording head engaging a magnetic sheet wrapped around said drum and rotatable therewith to record and reproduce a sound track on said sheet, means connected with said drum and said spindle for rotating them, whereby said sound head means are moved along said spindle during the recording and reproducing, a spring engaging one end of said spindle and pressing it toward the other end thereof, a plate engaging said other end of the spindle, another plate firmly connected with the first-mentioned plate, means pivotally supporting said plates, a rod having an end engaging said other plate, and means shifting longitudinally the position of said rod, whereby the position of said spindle is varied in the direction of its axis and the position of said sound head means upon said sheet is adjusted.

2. In a sound recording and reproducing machine, a sheet-carrying drum, a threaded spindle extending parallel to the axis of said drum, sound head means comprising a follower engaging the threads of said spindle and a recording head engaging a magnetic sheet wrapped around said drum and rotatable therewith to record and reproduce a sound track on said sheet, means connected with said drum and said spindle for rotating them, whereby said sound head means are moved along said spindle during the recording and reproducing, a spring engaging one end of said spindle and pressing it toward the other end thereof, a plate engaging said other end of the spindle, another plate firmly connected with the first-mentioned plate, means pivotally supporting said plates, a rod having a threaded portion and an end engaging said other plate, a tube having threads meshing with the threaded portion of said rod, whereby a turning of said rod will shift it longitudinally, and means connected with said tube for turning said tube jointly with said rod to a plurality of predetermined positions corresponding to predetermined sound tracks upon said magnetic sheet.

3. In a sound recording and reproducing machine, a sheet-carrying drum, a threaded spindle extending parallel to the axis of said drum, sound head means comprising a follower engaging the threads of said spindle and a recording head engaging a magnetic sheet wrapped around said drum and rotatable therewith to record and reproduce a sound track on said sheet, means connected with said drum and said spindle for rotating them, whereby said sound head means are moved along said spindle during the recording and reproducing, a spring engaging one end of said spindle and pressing it toward the other end thereof, a plate engaging said other end of the spindle, another plate firmly connected with the first-mentioned plate, means pivotally supporting said plates, a rod having a flange, a threaded portion and an end engaging said other plate, a tube enclosing a portion of said rod and having threads meshing with the threaded portion of said rod, whereby a turning of said rod will shift it longitudinally, a pin carried by said rod, and extending through an opening formed in said tube, a spring located within said tube and engaging said flange, and a sleeve comprising an edge having a plurality of notches adapted to receive an end of said pin, whereby the positions of said pin correspond to predetermined sound tracks upon said magnetic sheet.

4. In a sound recording and reproducing machine, a sheet-carrying drum, a threaded spindle extending parallel to the axis of said drum, sound head means comprising a follower engaging the threads of said spindle and a recording head engaging a magnetic sheet wrapped around said drum and rotatable therewith to record and reproduce a sound track on said sheet, means connected with said drum and said spindle for rotating them, whereby said sound head means are moved along said spindle during the recording and reproducing, a spring engaging one end of said spindle and pressing it toward the other end thereof, a plate engaging said other end of the spindle, another plate firmly connected with the first-mentioned plate, means pivotally supporting said plates, a rod having a flange, a threaded portion and an end engaging said other plate, a tube enclosing a portion of said rod and having threads meshing with the threaded portion of said rod, whereby a turning of said rod will shift it longitudinally, a stop member connected with said tube, a frame, and means connected with said frame and engaged by said stop member in a plurality of positions corresponding to predetermined sound tracks upon said magnetic sheet.

ERNST KELLER.

References Cited in the file of this patent
UNITED STATES PATENTS

| Number | Name | Date |
|---|---|---|
| 479,431 | Lahola | July 26, 1892 |
| 511,402 | Bruening | Dec. 26, 1893 |
| 1,792,159 | Gonzalez | Feb. 10, 1931 |
| 2,003,434 | Goldhammer | June 4, 1935 |
| 2,043,884 | Crudo | June 9, 1936 |
| 2,082,353 | Proctor | June 1, 1937 |
| 2,284,043 | Clausen | May 26, 1942 |
| 2,410,569 | Conant | Nov. 5, 1946 |
| 2,530,029 | Pond | Nov. 14, 1950 |